(12) United States Patent
Hirai et al.

(10) Patent No.: US 7,070,335 B2
(45) Date of Patent: Jul. 4, 2006

(54) ROLLING BEARING

(75) Inventors: Eiji Hirai, Kanagawa (JP); Mitsuhiro Okuhata, Kanagawa (JP); Nobuo Kino, Kanagawa (JP); Keizo Otani, Kanagawa (JP); Tomofumi Furukawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/295,042

(22) Filed: Nov. 15, 2002

(65) Prior Publication Data
US 2003/0165279 A1    Sep. 4, 2003

(30) Foreign Application Priority Data
Nov. 15, 2001  (JP)  ............................. 2001-349645
Nov. 22, 2001  (JP)  ............................. 2001-356817
Apr. 16, 2002  (JP)  ............................. 2002-113382

(51) Int. Cl.
*F16C 33/32*    (2006.01)
(52) U.S. Cl. ................................... 384/492
(58) Field of Classification Search ............... 384/492, 384/565, 570, 571
See application file for complete search history.

(56) References Cited

U.S. PATENT DOCUMENTS

| 2,980,987 A | 4/1961 | Lamson et al. |
| 4,508,396 A | 4/1985 | Doi et al. |
| 5,150,974 A | 9/1992 | Tamada et al. |
| 5,927,865 A * | 7/1999 | Ito et al. ...................... 384/492 |
| 6,102,574 A * | 8/2000 | Proschel et al. ............ 384/476 |

FOREIGN PATENT DOCUMENTS

| JP | 60-78110 | * | 5/1985 | ................ 384/476 |
| JP | 63-180722 | * | 7/1988 | ................ 384/476 |
| JP | 63-180722 A | | 7/1988 | |
| JP | 2-190615 A | | 7/1990 | |
| JP | 5-255809 A | | 10/1993 | |
| JP | 8-177864 A | | 7/1996 | |
| JP | 2001-20958 A | | 1/2001 | |

OTHER PUBLICATIONS

K. Tamada et al., "A New Type of Microstructural Change in Bearings for Electrical Instruments and Auxiliary Devices of Automotive Engines", NTN Technical Review No. 61, 1992, pp. 29–39.

(Continued)

Primary Examiner—Lenard A. Footland
(74) Attorney, Agent, or Firm—Foley & Lardner LLP

(57) ABSTRACT

A rolling bearing used in a system including an automotive power train and a peripheral auxiliary equipment of the power train, and in a compressor. The rolling bearing comprises a first race and a second race. A rolling element is rotatably disposed between the first and second races. A film whose main component is a metal selected from the group consisting of nickel and copper has a thickness ranging from 0.1 to 15 μm. The film is formed on a surface of at least one of the first race, the second race and the rolling element.

21 Claims, 13 Drawing Sheets

OTHER PUBLICATIONS

Y. Murakami et al., "Study on Fatigue Mechanism of Bearings for Automotive Alternators", NSK Technical Journal No. 656, 1993, pp. 1-14.

Japanese Industrial Standard (JIS), "Vickers Hardness Test—Test Method", JIS Z 2244, 1998, pp. 1-8.

Japanese Industrial Standard (JIS), "High Carbon Chromium Bearing Steels", JIS G 4805, 1999, pp. 1-31.

Japanese Industrial Standard (JIS), "Rolling Bearings—Designation", JIS B 1513, 1995, pp. 1-10.

T. Saito, "Practice of Carburizing Hardening", Nikkan Kogyou Shinbunsha, Aug. 30, 1979, pp. 188-191 and 242-247.

K. Sato et al., "Hydrogen Embrittlement of a Compressor Thrust Bearing with Replacement Refrigerant HFC 134a", Tribologist, vol. 37, No. 11, 1992, pp. 918-922.

U.S. Appl. No. 10/295,038, filed Nov. 15, 2000, Hirai et al.

* cited by examiner

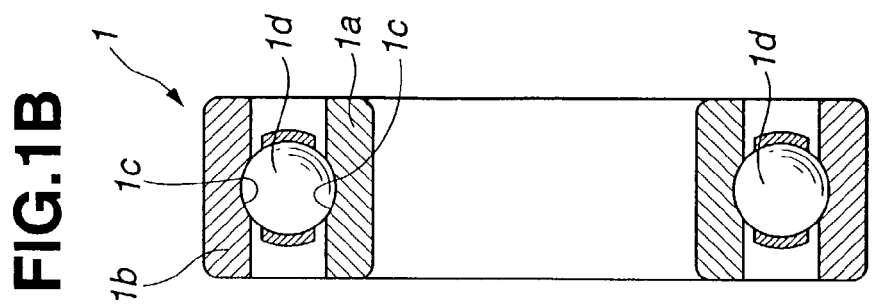
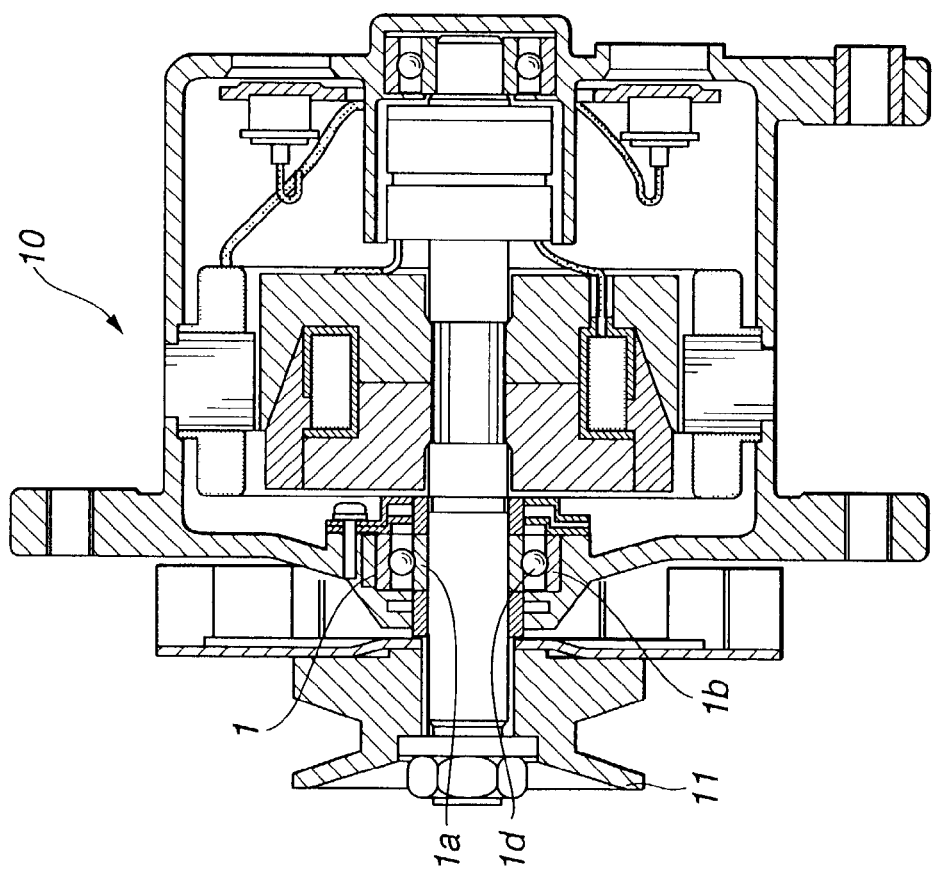

ROLLING BEARING

BACKGROUND OF THE INVENTION

The present invention relates to improvements in a rolling bearing, and more particularly to the rolling bearing for an automotive power train, which is used to support a power transmitting part such as a gear, a shaft, and a pulley in an automotive power train, for example, in a transmission, used to support a power transmitting part in a belt-type continuously variable transmission serving as an automotive power train, and suitably used for peripheral auxiliary equipment for an automotive power train such as a grease-filled bearing used for an alternator, electromagnetic clutch, idler pulley, etc. and the rolling bearing used for a fuel injection pump. The rolling bearing is also suitably used for a compressor, for exaemple, of an air conditioner, which is operated under a lubricating condition in which hydrofluorocarbon as a refrigerant and a lubricant dissolvable in the hydrofluororcarbon are mixed.

In recent years, a power train used for a motor vehicle or the like has been required to be small in size and light in weight to improve fuel efficiency and increase the power. Accordingly, a rolling/sliding member such as a rolling bearing, gear, and the like used for a power train is forced to be operated in a severe environment such as high load and high rotational speed, in addition to the requirement for being small in size and light in weight.

For example, in the case of a grease-filled bearing used for an alternator, electromagnetic clutch, and the like, not only it is required to be small in size and light in weight, but also it is used in a severe environment such as high load, high rotational speed, and high vibration. As a result, as described in NTN Technical Review No. 61 and NSK Technical Journal No. 656, there is a report that the grease-filled bearing separates in a short life due to a change in structure of peculiar mode in the rolling surface.

As described in NTN Technical Review No. 61, the cause for this short-life flaking is thought to be that the use in a severe environment such as high load, high rotation, and high vibration causes so-called mirror-surface wear of rolling surface, the formation of new metal surface caused by this wear plays a catalytic role to decompose grease or entering water, and hydrogen generated at this time intrudes into steel, which results in flaking due to hydrogen enbrittlement.

It is thought that at this time, the hydrogen embrittlement flaking in the rolling surface is caused through (1) a step in which a hydrogen atom or ion is generated by the decomposition of hydrocarbon or entering water→(2) a step in which the generated hydrogen atom or ion intrudes into steel→(3) a step in which the material is embrittled by the intruding hydrogen.

Conventionally, as measures against the above-described short-life flaking due to hydrogen embrittlement, measures in which triiron tetroxide is formed on the rolling surface by black oxide finishing (as disclosed in Japanese Patent Provisional Publication No. 2-190615), measures in which a lubricant containing a deactivator is used to reform the rolling surface so that the reaction of deactivator is accelerated (as disclosed in Japanese Patent Provisional Publication No. 2001-20958), and measures in which the content of Cr of base material is increased to form an inert oxide film such as $FeCrO_4$ on the surface (as disclosed in Japanese Patent Provisional Publication No. 8-177864) have been taken.

In these measures, the inert oxide film is formed on the rolling surface, and thus catalytic action due to the formation of new surface is restrained, by which the decomposition reaction of hydrocarbon or entering water is made less liable to occur to reduce the amount of generated hydrogen, that is, the aforementioned hydrogen generating step (1) is improved. However, since the catalytic action against the decomposition reaction of hydrocarbon exists not only on the new surface but also in acid etc. yielded by the decomposition of entering water and an additive, the generation of hydrogen cannot be restrained completely by only the inert film depending on the lubrication environment, and it is difficult to prevent the generated hydrogen from intruding into steel.

Also, a conventional technique in which Al, Nb, N, etc. are added to steel to make the austenitic crystal grain fine, by which a metal structure invulnerable to hydrogen embrittlement has been disclosed in Japanese Patent Provisional Publication No. 5-255809.

In this technique, the resistance to hydrogen embrittlement of the material is increased by finer crystal grain, that is, the aforementioned material embrittlement step (3) is improved. However, finer crystal grain increases the area ratio of crystal grain boundary, which is a hydrogen intruding passage, so that the amount of hydrogen intruding into steel sometimes increase.

Therefore, a rolling member and a sliding member that can restrain the short-life flaking due to hydrogen embrittlement must be provided by improving the aforementioned hydrogen intruding process (2), which has not been improved by the conventional technique, that is, by surely restraining the intrusion of hydrogen into steel even if the amount of generated hydrogen is increased by a change in service environment or lubrication environment.

SUMMARY OF THE INVENTION

There has so far been a report that the above-described short-life flaking phenomenon due to hydrogen embrittlement sometimes occurs in a grease-filled bearing used in engine auxiliary equipment such as an alternator, idler pulley, etc. as described above. However, a rolling bearing for engine peripheral auxiliary equipment other than the above, for example, a rolling bearing used for an electromagnetic clutch for an automotive air conditioner and a fuel injection pump, and further a rolling bearing for supporting a power transmitting part such as a gear, shaft, pulley, etc. in a transmission serving as an automotive power train or for supporting a power transmitting part in a belt-type continuously variable transmission serving as an automotive power train have a problem in that there is a future possibility of the occurrence of the above-described phenomenon due to hydrogen embrittlement in the tendency of decreased size and weight of parts and increased capacity. Therefore, solving this problem has been a conventional theme.

The above-discussed drawbacks have been encountered similarly in a rolling bearing for a compressor, used under a lubrication condition in which hydrofluorocarbon as a refrigerant and a lubricant dissolvable in the hydrofrluorocarbon are mixed.

The present invention has been made by paying attention to and is intended to solve the above-described conventional problems.

It is, therefore, an object of the present invention is to provide an improved rolling bearing which can effectively overcome drawbacks encountered in conventional rolling bearings.

Another object of the present invention is to provide an improved rolling bearing for an automotive power train, in which the intrusion of hydrogen into steel can be surely restrained even if the amount of generated hydrogen is increased by a change in service environment or lubrication environment, thereby preventing the short-life flaking due to hydrogen embrittlement.

A further object of the present invention is to provide an improved rolling bearing for a compressor used under a conditon in which a refrigerant is mixed with a luricant, in which the intrusion of hydrogen into steel can be surely restrained even if the amount of generated hydrogen is increased by a change in service environment or lubrication environment, thereby preventig the short-life flaking due to hydrogen embrittlement.

An aspect of the present invention resides in a rolling bearing comprising a first race and a second race. A rolling element is rotatably disposed between the first and second races. A film whose main component is a metal selected from the group consisting of nickel and copper is formed on a surface of at least one of the first race, the second race and the rolling element.

Another aspect or the present invention resides in a rolling bearing used in a system including an automotive power train and a peripheral auxiliary equipment of the power train. The rolling bearing comprises a first race and a second race. A rolling element is rotatably disposed between the first and second races. A film whose main component is a metal selected from the group consisting of nickel and copper has a thickness ranging from 0.1 to 15 μm. The film is formed on a surface of at least one of the first race, the second race and the rolling element.

A still further aspect of the present invention resides in a rolling bearing for a compressor, used under a lubricating condition in which hydrofluorocarbon as a refrigerant and a lubricant dissolvable in the hydrofluorocarbon are mixed. The rolling bearing comprises a first race and a second race. A rolling element is rotatably disposed between the first and second races. A film whose main component is a metal selected from the group consisting of nickel and copper. The film is formed on a surface of at least one of the first race, the second race and the rolling element.

BRIEF DESCRIPTION OF THE DRAWINGS

FIG. 1A is a schematic sectional view of an alternator including an embodiment of a rolling bearing for an automotive power train in accordance with the present invention, showing a state in which it is assembled to an alternator;

FIG. 1B is a schematic enlarged sectional view of a deep groove ball bearing used as the rolling bearing of FIG. 1A;

DETAILED DESCRIPTION OF THE INVENTION

Figure 2:
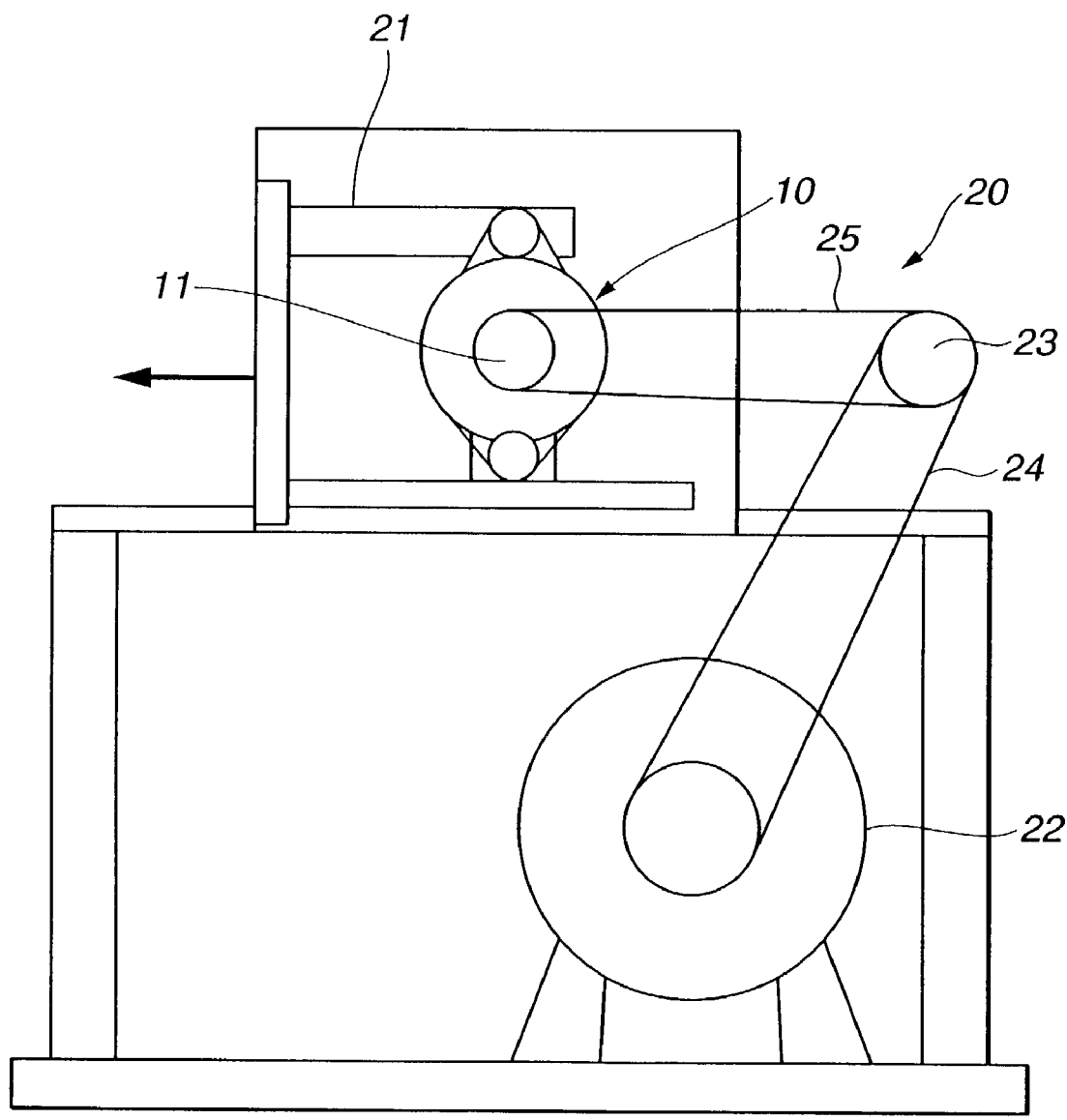
FIG. 2 is a schematic explanatory view of a bench for conducting a rapid acceleration/deceleration test of the deep groove ball bearing assembled to the alternator as shown in FIGS. 1A and 1B.

According to a first aspect of the present invention, a rolling bearing is used in a system including an automotive power train and a peripheral auxiliary equipment of the power train. The rolling bearing comprises a first race and a second race. A rolling element is rotatably disposed between the first and second races. A film whose main component is a metal selected from the group consisting of nickel (Ni) and copper (Cu) has a thickness ranging from 0.1 to 15 μm. The film is formed on a surface of at least one of the first race, the second race and the rolling element.

In the rolling bearing for the automotive power train in accordance with the present invention, the film which is made mainly of nickel (Ni) or copper (Cu), which has a low hydrogen diffusion coefficient, and has a thickness of 0.1 to 15 μm is formed on at least one member of an inner race (ring), an outer race (ring), balls or rollers, etc (these are referred also as base materials to which the film is formed). Therefore, the exposure of a new iron surface due to microscopic metal contact is restrained, and thus the intrusion of hydrogen produced during rolling by the decomposition of hydrocarbon or entering water or other causes into steel is restrained. That is to say, since the diffusion of hydrogen delays on the surface, hydrogen stays on the surface, so that the intrusion of hydrogen into a portion in which the internal stress is high delays, and thus the amount of intruding hydrogen per unit time decreases. In other words, the elements such as nickel and copper are very low in diffusio coefficient of hydrogen as compared with iron, and therefore diffusion of hydrogen is largely delayed at the surface so that hydrogen is stayed at the surface if the film of nickel or copper is formed at the surface. As a result, intrusion of hydrogen into an internal position at which stress is high can be delayed thereby decreasing the amount of intruding hydrogen per unit time.

In the case where the portion in which the film is formed is limited from the viewpoint of cost etc., it is preferable that the film be formed in a portion in which hydrogen embrittlement flaking is liable to occur, for example, on the inner race or outer race (at least fixed-side race for radial ball bearing) or ball for a ball bearing, and on the roller for the roller bearing.

Also, the reason why it is preferable that the film formed mainly of nickel (Ni) or copper (Cu) have a thickness of 0.1 to 15 µm is as follows: If the film thickness is smaller than 0.1 µm, the film is worn during the operation, so that the action of film shutting off the intrusion of hydrogen and the action of film restraining the exposure of new iron surface is difficult to be achieved for a long period of time. Therefore, sufficient resistance to hydrogen embrittlement cannot be provided.

On the other hand, even if the thickness of the film formed mainly of nickel (Ni) or copper (Cu) exceeds 15 µm, the stress in the film becomes excessive as the film thickness increases. Therefore, film flaking occurs at a relatively early stage, and the film does undesirably not contribute so much to the improvement in rolling fatigue life. Especially in the case of radial bearing, the rotation accuracy is decreased by the increase in radial clearance of bearing due to film wear during the operation, so that vibrations are increased or noise is created, which undesirably decreases the flaking life of bearing. Also, simultaneously with the increase in film thickness, the treatment time is prolonged. As a result, the cost becomes high. Therefore, it is also undesirable that the film thickness exceeds 15 µm.

Also, in the rolling bearing for an automotive power train in accordance with claim 2 of the present invention, it is preferable that the sum of film thicknesses formed on the inner race, outer race, and the rolling element is preferably in a relation of [a film thicknes of a fixed-side race+2×(a film thickness of a driving-side race+a film thickness of the rolling element)]≦15 µm.

For example, in a radial bearing to which a radial load is applied from one direction, when a film of 5 µm thick is formed only the fixed-side race, and the whole of the film is worn during the operation, only the load-applied side is worn, so that the bearing gap increases by 5 µm. On the other hand, when a film of 5 µm thick is formed only the driving-side race or the ball, and the whole of the film is worn during the operation, since both elements rotate, the radial gap increases by 5 µm×2=10 µm.

Therefore, film thickness of [fixed-side race+2×(film thickness of driving-side race+film thickness of rolling element)] exceeds 15 µm, like the above-described case, the rotation accuracy is decreased by the increase in radial gap of bearing, so that vibrations are increased or noise is created, which undesirably decreases the flaking life of bearing.

Figure 5:
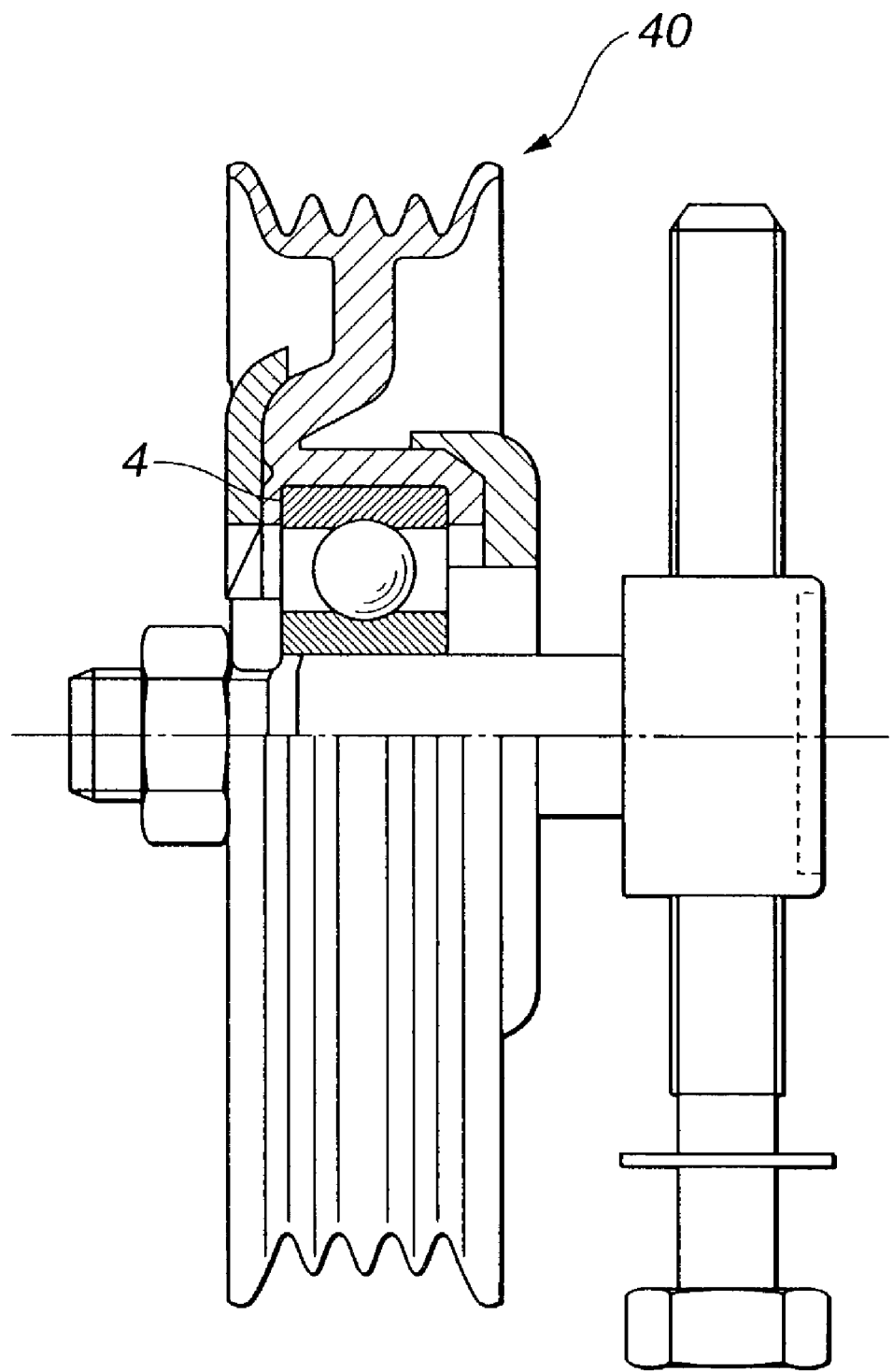
FIG. 5 is a schematic sectional view showing a state in which a rolling bearing for an automotive power train in accordance with the present invention is assembled to an idler pulley.

For example, in the case of a bearing 1 for an alternator 10 as shown in FIGS. 1A and 1B, the fixed-side race is an outer race 1b while the driving-side race is an inner race 1a. In the case of a bearing 4 used for an idler pulley 40 as shown in FIG. 5, the fixed-side race is an inner race while the driving-side race is an outer race Further, in the rolling bearing for an automotive power train in accordance with the present invention, it is preferable since the film is formed by electroplating or electroless plating, the film for shutting off intruding hydrogen can be formed by relatively easy treatment, so that high versatility and mass-productivity can be achieved.

Still further, in the rolling bearing for an automotive power train in accordance with the present invention, it is preferable that at the stage at which plating is finished, baking is performed at a temperature of 200° C. or lower. Therefore, the hydrogen intruding into the base material or film at the time of the electroplating or electroless plating treatment and the hydrogen intruding into the base material at the time of raw material heat treatment (for example, carbonitriding) are released.

If the baking temperature is higher than 200° C., although the amount of hydrogen released by baking increases, the base material is sometimes softened by being held at a high temperature. Therefore, by setting the baking temperature at 200° C. or lower, the softening of base material is inhibited while the hydrogen releasing effect is maintained. The baking is preferably performed in a vacuum furnace, by which the hydrogen releasing effect is further increased.

Still further, in the rolling bearing for an automotive power train in accordance with the present invention, it is preferable that a surface portion on which plating is made, of the base material has an average microhardness (HV (0.025)) of not higher than 850, an α-Fe[211] peak half-power band width of not lower than 6.5, and a compressive residual stress of not higher than 1000 MPa. This largely improves the adhesiveness of the film of plating to the base material thereby increasing a hydrogen intrusion suppress in effect, and therefore flaking at the rolling-contat surface of the base material due to hydrogen embrittlement can be effectively prevented.

According to the rolling bearing for an automotive power train in accordance with the present invention, since the bearing is configured as described above, even if the amount of generating hydrogen is increased by a change in service environment or lubrication environment, not only the exposure of a new iron surface due to microscopic metal contact is restrained but also the film of nickel or copper which is very low in diffusion coefficient of hydrogen serves as a hydrogen intrusion preventing layer, thus securely inhibiting the intrusion of hydrogen into steel. As a result, a very great effect of being capable of preventing short-life flaking due to hydrogen embrittlement is achieved.

Additionally, according to the rolling bearing for an automotive power train in accordance with the present invention, the film for shutting off intruding hydrogen can be formed by a relatively easy treatment, so that a very great effect of being capable of realizing the improvement in versatility and mass-productivity is achieved.

Further, according to the rolling bearing for an automotive power train in accordance with the present invention, since the bearing is configured as described above, a very great effect of being capable of releasing the hydrogen intruding into the base material or film at the time of the electroplating or electroless plating treatment and the hydrogen intruding into the base material at the time of raw material heat treatment (for example, carburizing hardening) is achieved.

Still further, according to the rolling bearing for an automotive power train in accordance with the present invention, the adhesiveness of the film of plating to the base material can be ipmroved to increase an hydrogen intrusion suppression effect, thereby improving an effect of preveting flaking of the rolling-contat surface of the base material due to hydrogen embrittlement.

Still further, according to the rolling bearing for an automotive power train in accordance with the present invention, the operation in a severe environment of the engine peripheral auxiliary equipment, that is, the alternator, idler pulley, and electromagnetic clutch for an automotive air conditioner can be performed smoothly without trouble. According to the rolling bearing for an automotive power train in accordance with the present invention, the operation in a severe environment of the engine peripheral auxiliary equipment, that is, the fuel injection pump can be performed smoothly. According to the rolling bearing for an automotive power train in accordance with the present invention, the power transmitting part can be made smaller in size and higher in capacity. According to the rolling bearing for an automotive power train in accordance with the present invention, a very great effect of being capable of making the unit of belt-type continuously variable transmission smaller in size and higher in capacity.

EXAMPLES

Examples of a rolling bearing for an automotive power train in accordance with the present invention will now be described, and the usefulness thereof will be shown in comparison with comparative examples. The measured values for the rolling bearing for an automotive power train in accordance with the present invention are those obtained by the following methods.

[Measuring Method for Film Thickness]

For the film thickness of a prepared specimen, the cross section of a film forming portion was quantified by observation using a SEM (Scanning Electron Microscope).

[Measuring Method for Phosphorus Content in Film]

The phosphorus content in film of the prepared specimen was quantified by using a commercially-available X-ray fluorescence analyzer. A plurality of samples whose phosphorus content was known and which had different content were measured. At this time, a strength-content calibration curve is prepared from each strength. The rolling bearing for an automotive power train in accordance with the present invention was cut into an appropriate size under the same condition, and measurement was made. The measured strength was converted into phosphorus content based on the aforementioned calibration curve.

[Measuring Method for Microhardness]

The microhardness of a portion (rolling-contact portion) to be plated, of the base material was measured as follows: After plating, the plated rolling-contact portion was cut out to expose the cut surface of the base material. The hardness of the exposed cut surface was measured at a position below 5 to 10 μm from the surface (the interface between the plated film and the base material) of the base material by a Micro Vickers hardness Tester NS-IV2000 (produced by Nippon Steel Corporation) with a pressing load of 25 g (=Hv (0.025)). This measurement of the hardness was made according to JIS (Japanese Industrial Standard) Z 2244 and made at several points on the exposed cut surface of the base material, in which the average of several harness measurements was defined as an average microhardness.

[α-Fe[211] Peak Half-Power Band Width and Compressive Residual Stress of Surface of Base Material]

An α-Fe[211] peak half-power band width (i.e., a half-power band width of a peak obtained by X-ray diffraction) and a compressive residual stress of the base material were measured by a micro-X ray stress measuring device PSPC-RSF (produced by Rigaku Corporation). Measurement of the α-Fe[211] peak half-power band width and the compressive residual stress was carried out at a polished surface located 10μ below the surface (the interface between the plated film and the base material) of the base material. The polished surface was in a surface portion whose surface would be covered with the plated film. The polished surface was obtained by electrolytic polishing, before the measurement. The compressive residual stress was in a circumferential direction of the base materail. The measurement values at the polished surface were defined respectively as α-Fe[211] peak half-power band width and compressive residual stress of the base material. The α-Fe[211] peak half-power band width represents a degree of deformation (such distortion and unconformity) of structure of the base material. The half-power band width is discussed at pages 242 to 246 of a technical text book "Practice of Carburizing hardening" (written by Takeshi Saito and published Aug. 30, 1979 by Nikkan Kogyou Shinbunsha in Japan).

Next, a manufacturing method for the rolling bearing for an automotive power train in accordance with the present invention will be described.

Figure 9:
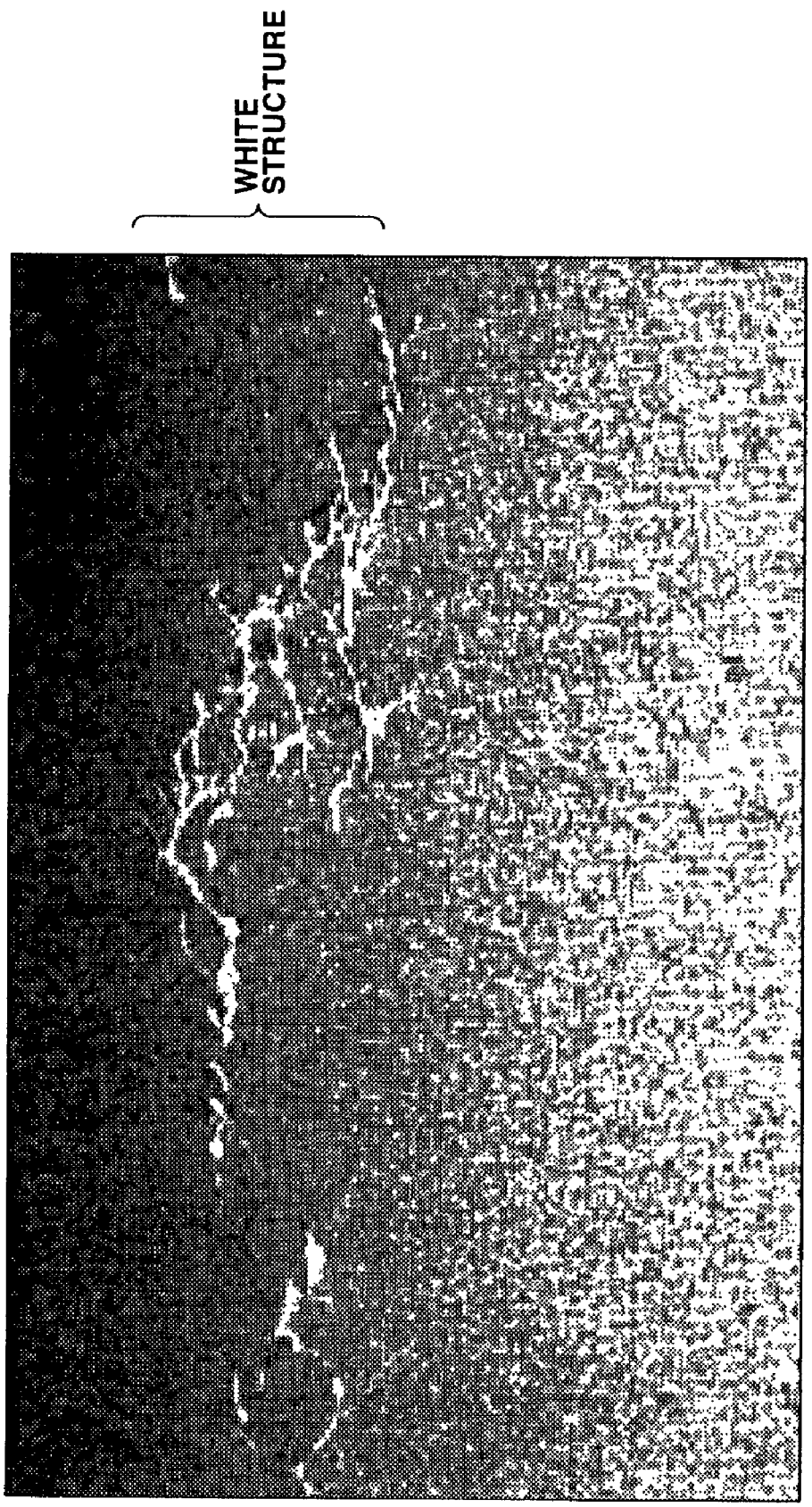
FIG. 9 is a photograph showing a cross-sectional microstructure (with white structure) in the rolling direction near a flaked portion of a deep groove ball bearing after a rapid acceleration/deceleration test.

Using a commercially-available deep groove ball bearing (as shown in FIGS. 1 and 9) made of a material of SUJ2 accoording to JIS G 4805 and a thrust roller bearing (see FIG. 3), various types of films were formed under the following conditions.

[Conditions for Forming a Film Mainly Made of Nickel (Ni)]

1) Base material for forming film: Ring surface, ball, and roller of rolling bearing
2) Composition of plating solution in plating bath:

| A. Strike plating bath (Ni-based) | |
|---|---|
| Nickel chloride | 200 g/L(liter) |
| Hydrochloric acid | 80 g/L |
| Boric acid | 30 g/L |
| pH | 1 or less |
| Plating bath temperature | 50 to 55° C. |
| Current density | 0.1 to 10 A/dm$^2$ |
| B. Electroplating bath (Ni-based) | |
| 60% nickel sulfamate (aqueous solution) | 800 g/L |
| Nickel chloride | 15 g/L |
| Boric acid | 45 g/L |
| Saccharin soda | 5 g/L |
| 50% hypophosphorous acid (aqueous solution) | 0 or 1 g/L |
| pH | 4 to 5 |
| Plating bath temperature | 55 to 60° C. |
| Current density | 1 to 10 A/dm$^2$ |
| C. Electroless plating bath (Ni-based) | |
| Nickel chloride | 16 g/L |
| Sodium hypophosphite | 24 g/L |
| Sodium succinate | 16 g/L |
| Malic acid | 18 g/L |
| Diethylamine | 10 g/L |
| pH | 5 to 6 |
| Plating bath temperature | 90 to 95° C. |
| [Conditions for forming a film mainly consisting of copper (Cu)] | |
| D. Electroplating bath (Cu based) | |
| Cuprous cyanide | 60 g/L |
| Sodium cyanide | 75 g/L |
| Sodium carbonate | 30 g/L |
| PH | 12 to 13 |
| Plating bath temperature | 50 to 60° C. |
| Current density | 2 to 5 A/dm$^2$ |
| E. Electroless plating bath (Cu based) | |
| Copper sulfate | 10 g/L |
| Rochelle salt | 50 g/L |
| Sodium hydroxide | 10 g/L |

-continued

| | |
|---|---|
| Formalin (37% aqueous solution) | 10 g/L |
| Stabilizer | Slight amount |
| pH | 11 to 13 |
| Plating bath temperature | Room temperature |

<Deep groove ball bearing (radial bearing)>

Examples 1 to 6 and 8, and Comparative Example 2

After a bearing groove 1c in an outer race 1b on the fixed side of a rolling bearing 1 and/or in an inner race 1a on the driving side thereof was subjected to a Ni-based strike plating (the aforementioned bath A was used), a film made mainly of Ni was formed by the electroplating method (the aforementioned bath B was used).

As the plating bath used in forming the film made mainly of Ni by the electroplating method (the aforementioned bath B), in example 8 and comparative example 2, the plating bath in which which 1 g/L of 50% hypophosphorous acid was contained was used; and in examples 1 to 6, the plating bath in which which 50% hypophosphorous acid was not contained was used. Also, in example 6, after plating, baking was performed at 130° C. for 20 hours in a vacuum furnace.

Examples 2-1, 2-2, 2-3 and 2-4

The deep groove ball bearing of examples 2-1 was prepared by repeating the procedure of example 2 in which the film of the Ni-based platings was formed on the bearing groove 1c in the outer race 1b on the fixed side of the rolling bearing 1 without carrying out shot peening. The deep groove ball bearing of example 2-2 was prepared by repeating the procedure of example 2 in such a manner as to become different in physical properties from that of example 2. The deep groove ball bearing of example 2-3 was prepared by repeating the procedure of example 2-1 with the exception that the Ni-based platings were carried out after the outer race 1b was subjected to shot peening and thereafter underwent polish-finishing. The deep groove ball bearing of example 2-4 was prepared by repeating the procedure of example 2-3 in such a manner as to become different in physical properties from that of example 2-3. These examples 2-1 to 2-4 were prepared by evaluating the effects of the quality (or physical properties) of the surface of the base material on which the film of the platings was formed. The quality included the microhardness, the half-power bandwidth and compressive residual stress. The quality of the surface of each base material was shown in Table 1A and 1B.

Example 7

After the bearing grooves 1c in the outer race 1b on the fixed side of the rolling bearing 1 and in the inner race 1a on the driving side thereof were subjected to the Ni-based strike plating consisting mainly of nickel (Ni) (the aforementioned bath A was used), a film made mainly of Ni was formed by the electroless plating method (the aforementioned bath C was used).

Examples 9 to 11, and Comparative Example 3

A plating film made mainly of copper (Cu) was formed in the bearing groove 1c in the outer race 1b on the fixed side of the rolling bearing 1 or in the inner race 1a on the driving side thereof. When this Cu plating film was formed, in examples 9 and 10 and comparative example 3, the electroplating method (the aforementioned bath D was used) was used; and in example 11, the electroless plating method(the aforementioned bath E was used) was used. Also, in example 10, after plating, baking was performed at 130° C. for 20 hours in a vacuum furnace. Although the film was formed on the ring in this example, when the rolling element (ball) makes its flaking, the film may be formed on the rolling element.

Comparative Example 1

A specimen not subjected to plating was prepared.

<Thrust Roller Bearing>

Examples 1', 2' and 4' and Comparative Example 2'

Figure 3:
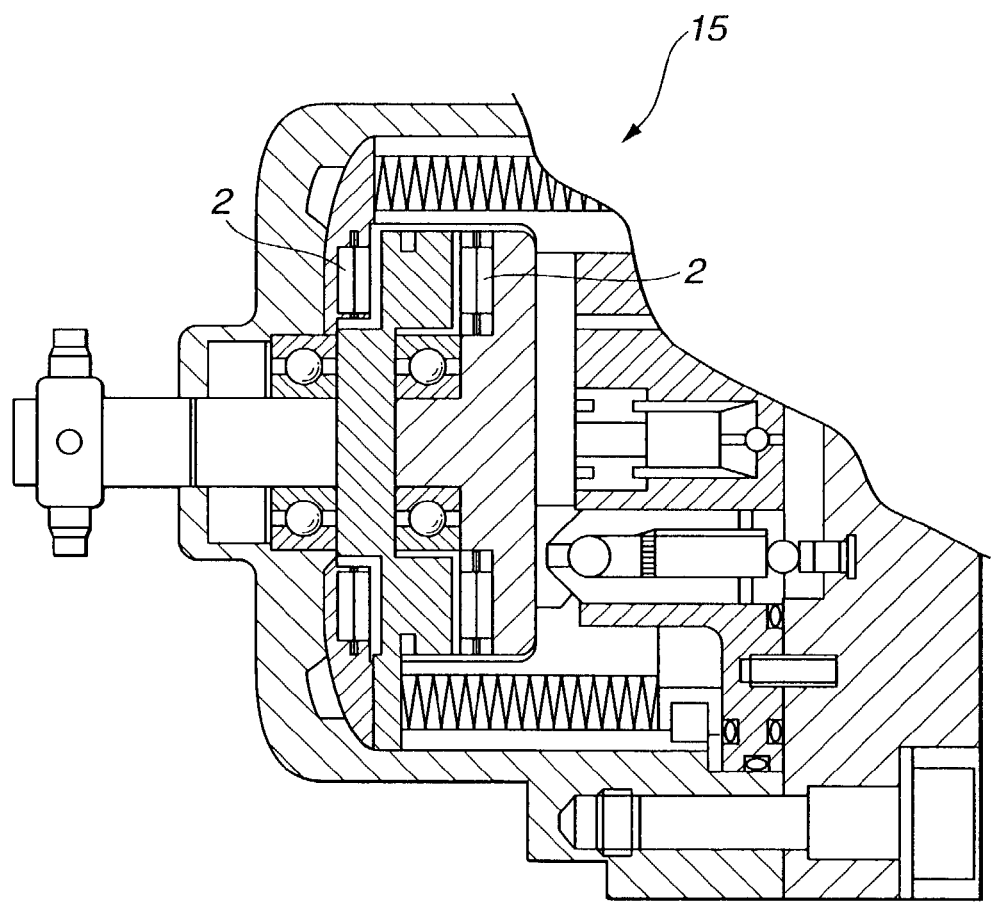
FIG. 3 is a schematic fragmentary sectional view of another embodiment of a rolling bearing for an automotive power train in accordance with the present invention, showing a state in which it is assembled to a fuel injection pump.
Figure 4:
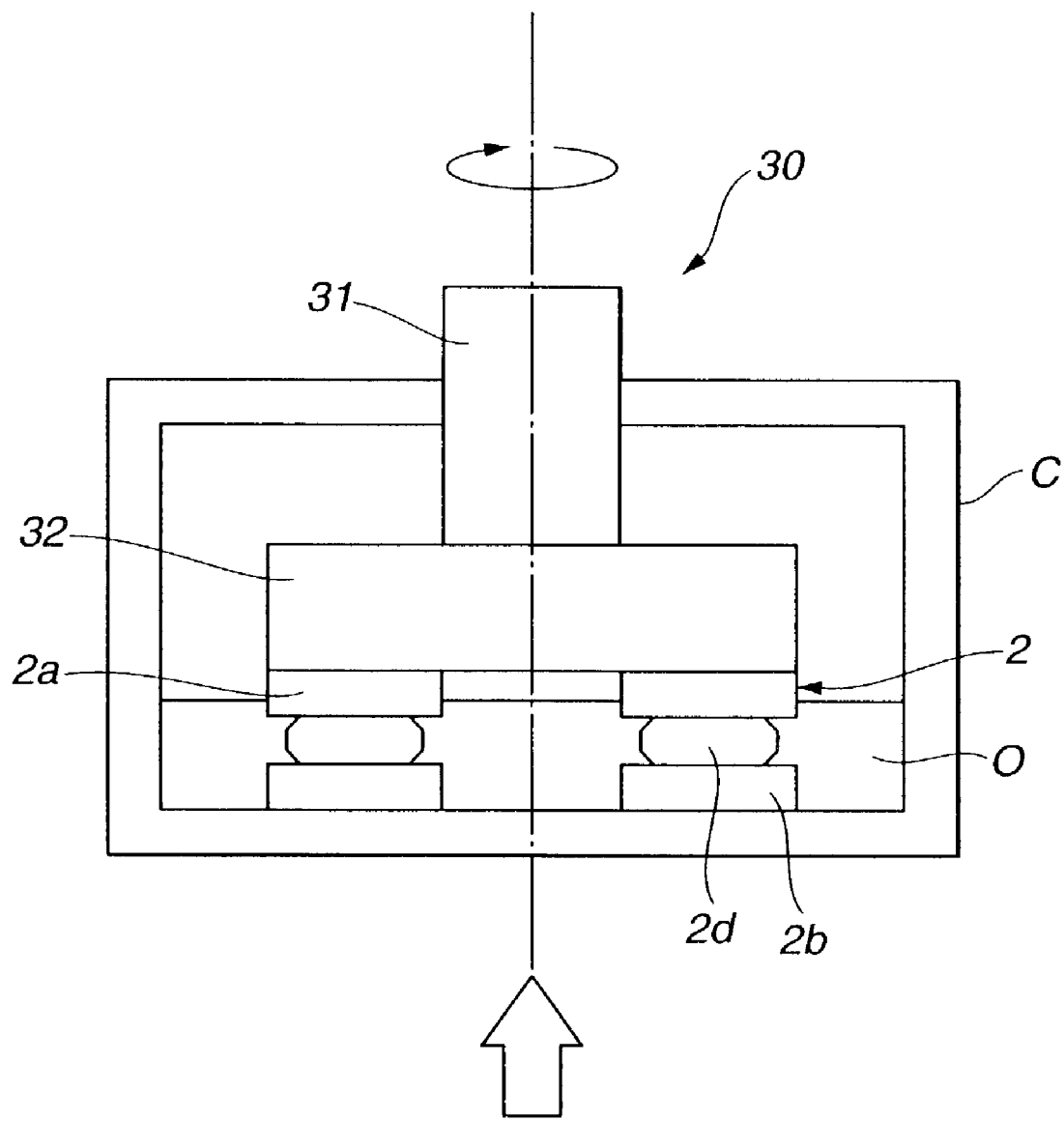
FIG. 4 is a schematic sectional view showing a state in which a thrust roller bearing assembled to a fuel injection pump shown in FIG. 3 is subjected to a rolling test by using a thrust testing machine.

After a roller 2d of a thrust roller bearing 2 as shown in FIGS. 3 and 4 was subjected to the Ni-based strike plating (the aforementioned bath A was used), a film made mainly of Ni was formed by the electroplating method (the aforementioned bath B was used).

As the plating bath used in forming the film made mainly of Ni by the electroplating method (the aforementioned bath B), in example 4' and comparative example 2', the plasting bath in which 1 g/L of 50% hypophosphorous acid was contained was used; and in examples 1' to 2', the plating bath in which which 50% hypophosphorous acid was not contained was used. Also, in example 1', after plating, baking was performed at 130° C. for 20 hours in a vacuum furnace.

Example 3'

After the roller 2d of the thrust roller bearing 2 as shown in FIGS. 3 and 4 was subjected to the Ni-based strike plating (the aforementioned bath A was used), a film consisting mainly of Ni was formed by the electroless plating method (the aforementioned bath C was used).

Examples 5', 6' and 7' and Comparative Example 3'

A plating film consisting mainly of copper (Cu) was formed on the roller 2d of the thrust roller bearing 2 as shown in FIGS. 3 and 4. When this Cu plating film was formed, in examples 5' and 6' and comparative example 3', the electroplating method (the aforementioned bath D was used) was used; and in example 7', the electroless plating method (the aforementioned bath E was used) was used. Also, in example 5', after plating, baking was performed at 130° C. for 20 hours in a vacuum furnace. Although the film was formed on the roller in this example, when the ring makes its flaking, the film may be formed on the ring.

Comparative Example 1'

A specimen not subjected to plating was prepared.

<Belt-Type Continuously Variable Transmission>

Example 1"

Figure 7:
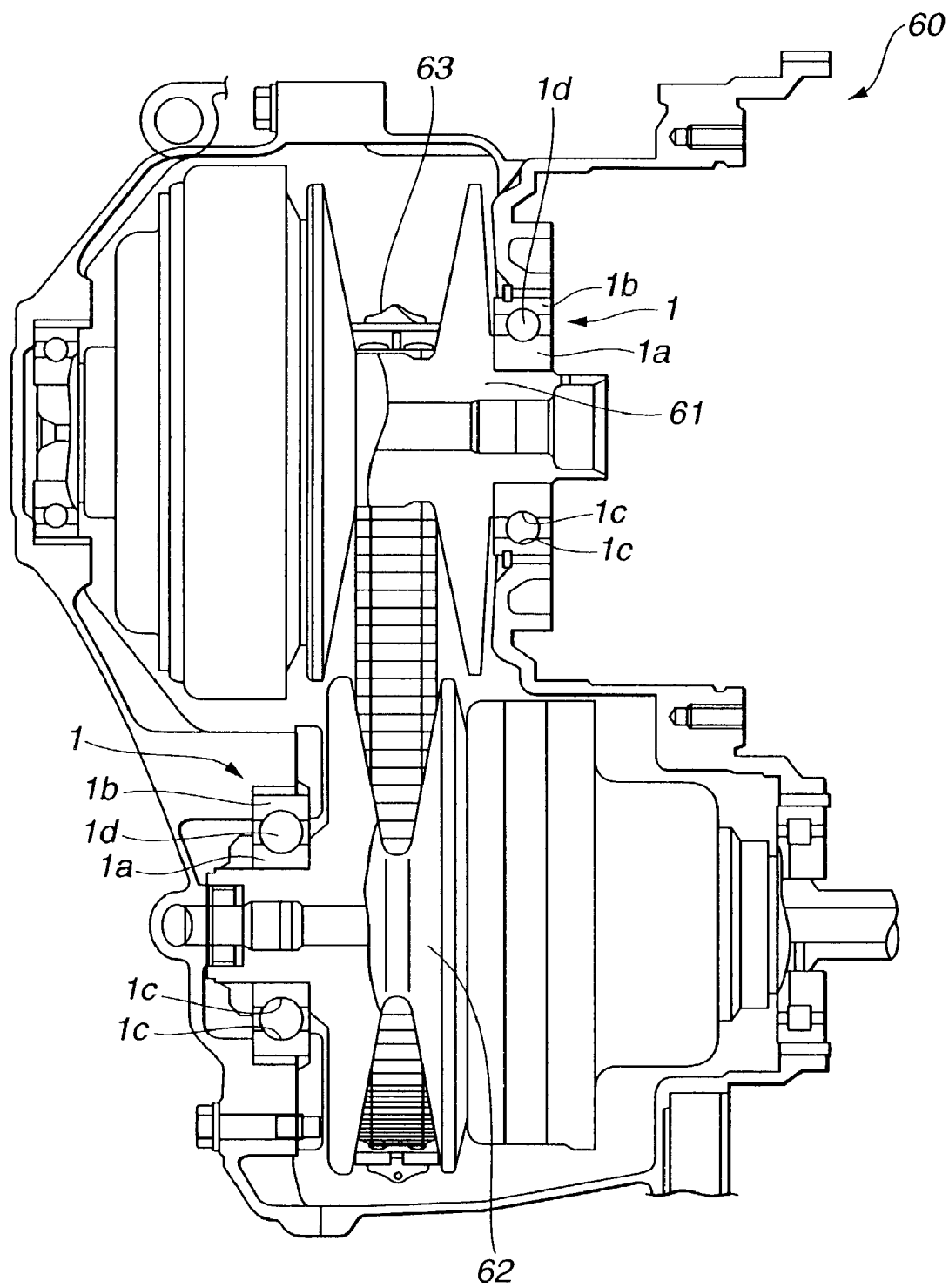
FIG. 7 is a fragmentary sectional view showing a state in which a rolling bearing for an automotive power train in accordance with the present invention is assembled to a belt-type continuously variable transmission.

As shown in FIG. 7, in a belt-type continuously variable transmission 60, after a bearing groove 1c in an outer race 1b on the fixed side of a rolling bearing 1 supporting a pulley and a bearing groove 1c in an inner race 1a on the driving side thereof were subjected to the Ni-based strike plating (the aforementioned bath A was used), a film made mainly of Ni was formed by the electroplating method (the aforementioned bath B was used). Although the film was formed on the ring in this example, when the rolling element (ball) makes its flaking, the film may be formed on the rolling element.

Next, methods for evaluating rolling bearings for an automotive power train in accordance with the present invention will be described.

In this case, the following two kinds of evaluations were performed by using three types of bearings.

(1) Deep Groove Ball Bearing (Simulating a Bearing for an Alternator Used as Engine Auxiliary Equipment)

An alternator 10 provided with a deep groove ball bearing (type 6303 according to JIS B 1513) shown in FIGS. 1A and 1B was fixed to a base 21, which can be moved horizontally, of a bench 20 as shown in FIG. 2, and a rapid acceleration/deceleration test was conducted by transmitting the output of a drive motor 22 to a pulley 11 of the alternator 10 via an intermediate pulley 23 and belts 24 and 25. Evaluation was performed while repeating rapid acceleration and deceleration in which the number of revolutions of the pulley 11 was changed from 2000 rpm to 14,000 rpm to 2000 rpm within a time of several seconds in a state in which an axial load of about 1.8 kN was applied in a direction indicated by an arrow. Also, a rolling fatigue life was detected by a vibration sensor, and the test time at which the bearing groove portion of a fixed ring or a driving ring of a front-side bearing is flaked was taken as a service life.

(2) Thrust Roller Bearing (Assuming a Roller Bearing for a Fuel Injection Pump Used as Engine Auxiliary Equipment)

As shown in FIG. 4, in an lubricating oil O containing water of about 1000 ppm, which was prepared by adding water to an engine oil, a roller bearing (FNTA-2542C manufactured by NSK Ltd.) 2 was set at the bottom of a lubricating oil vessel C filled with the lubricating oil O. The rolling test of the roller bearing 2 was conducted by bringing a pressing disk 32 of the rotating shaft 31 of a thrust testing machine 30 into contact with an inner race 2a located on the upper side in the figure and by rotating a rotating shaft 31 at 1000 rpm while applying a load (5880 Nm) in a direction indicated by a thick arrow in the figure. As shown, the rollers 3b are rotatably disposed bewteen the race 2a and the other race 2b. Also, a rolling fatigue life was detected by a vibration sensor, and the total revolutional number of the roller bearing reaching to a so-called 50% breakage was detected as a service life which was called L-50 service life (rev). In Table 3, the total revolution number is indicated, for example, as 3.36E+07 (corresponding to $3.36 \times 10^7$)

(3) Belt-Type Continuously Variable Transmission (Rolling Bearing Supporting a Power Transmitting Part)

As shown in FIG. 7, a CVT (continuously variable transmission) portion of a belt-type continuously variable transmission 60 includes a primary pulley 61, a secondary pulley 62, and a steel belt 63. The speed change is made by switching the contact radius of the steel belt 63 with respect to the primary pulley 61 and the secondary pulley 62 in a stepless manner. The box endurance test was conducted by using a box testing machine incorporating this CVT portion under the following test conditons:

Input number of revolutions: 4000 rpm;
Input torque: 30 kgfm;
Gear ratio: 1.0; and
Oil: Nissan CVT Field NS-1 (sold by Nissan Motor Co., Ltd.).

To evaluate the service life of rolling bearing, the service life in which the rolling bearing makes its flaking was measured while periodically replacing other parts.

Tables 1, 1A, 1B, 3 and 5 give the results (service lifes) of rolling fatigue life test of bearings in examples and comparative examples evaluated under the above-described test conditions. Tables 1, 3 and 5 also give rough characeristic summaries (specification, forming method, and film thickness) of the films of the bearings of examples and comparative examples examined before the test. As apparent from the results, the flaking evaluated under the above-described test conditions occurred on all outer races in Tables 1 and 5, and on all rollers in Table 3.

Figure 8:
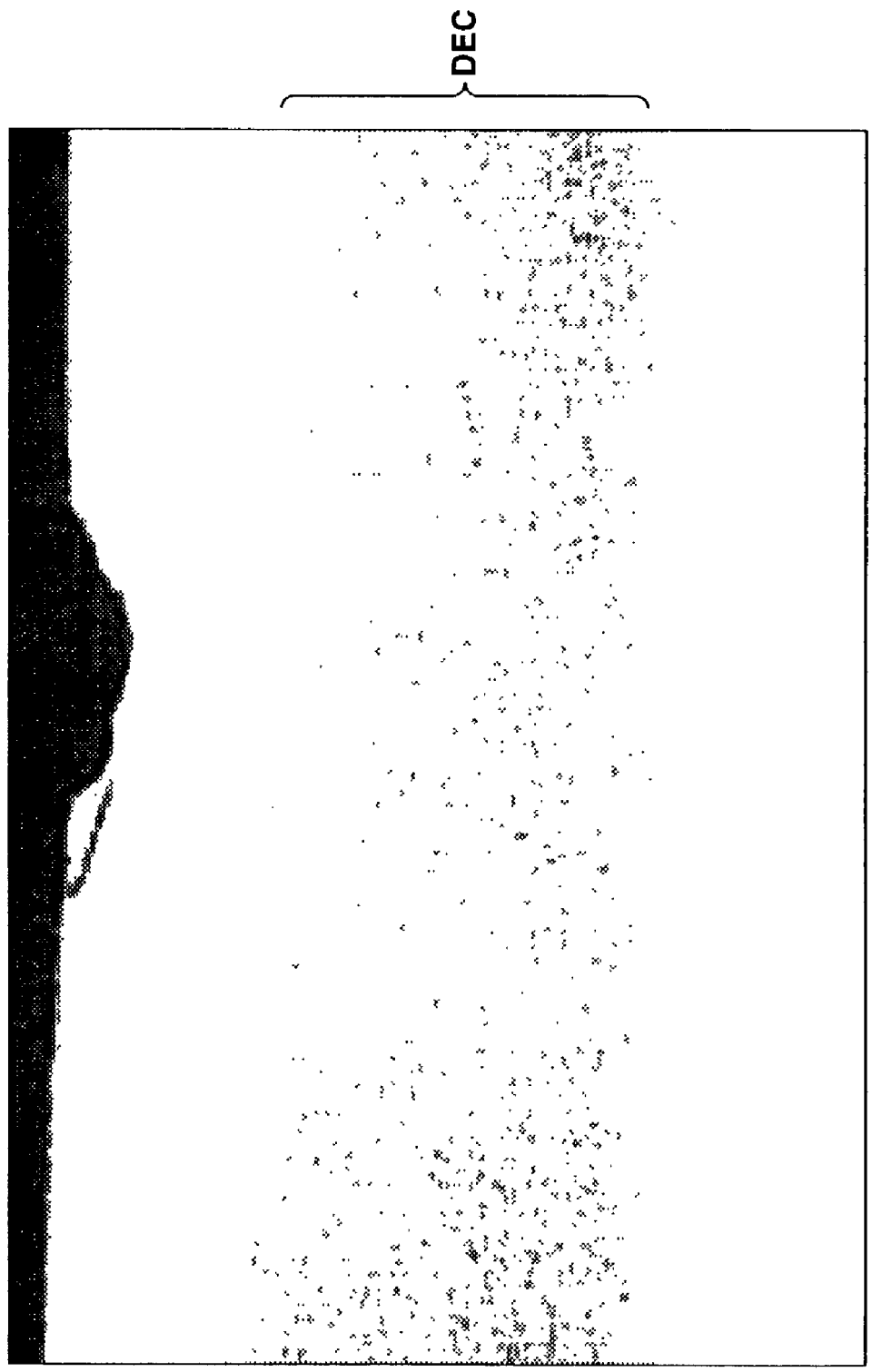
FIG. 8 is a photograph showing a cross-sectional microstructure (without white structure) in the rolling direction near a flaked portion of a deep groove ball bearing after a rapid acceleration/deceleration test.

Also, FIGS. 8 and 9 are photographs of cross-sectional microstructure in the rolling direction near a flaked portion of the deep groove ball bearing. In the photograph of FIG. 8, only a structure which is observed in a long-life specimen (corresponding to example 1) and whose inside is corroded slightly darkly is confirmed, and a white structure does not exist. On the other hand, in the photograph of FIG. 9, a white structure which is observed in a short-life specimen (corresponding to comparative example 1) and has an irregular mode is confirmed. These two kinds of structure changes were also confirmed near the flaked portion of the thrust roller bearing with the same tendency. Tables 1, 3 and 5 give the structure change mode in addition to the results of rolling fatigue test. In Tables, the structure corroded darkly is designated as DEC (dark etching constituent) and the white structure is designated as hydrogen embrittlement type.

Tables 2 and 4 give results obtained by cutting out a rolling portion from a specimen with different structure change mode, which had been subjected to the rolling fatigue test for detecting the rolling fatigue life, and by measuring the quantity of diffusible hydrogen in steel. The measurement was made by using a thermal desorption gas analyzer (UPM-ST-200R manufactured by ULVAC), and the quantity of hydrogen released at a heating temperature of 400° C. or lower was taken as the quantity of diffusible hydrogen. In Table 2, a new article corresponds to example 1 before the rolling fatigue test; a long-life article corresponds to example 1 after the rolling fatigue test; and a short-life article corresponds to comparative example 1 after the rolling fatigue life. In Table 4, a new article corresponds to example 1' before the rolling fatigue test; a long-life article corresponds to example 1' after the rolling fatigue test; and a short-life article corresponds to comparative example 1' after the rolling fatigue life.

TABLE 1

[Engine bench rapid acceleration/deceleration test]
Bearing: Deep groove ball bearing (type 6303)
Plating: Bearing groove portion

| | Specification | Forming method | Outer race film thickness (μm) | Inner race film thickness (μm) | Service life (hr) | Structure change |
|---|---|---|---|---|---|---|
| Example 1 | Ni film | Ni strike plating + Ni electroplating | 0.5 | 0.5 | 789 | DEC |

TABLE 1-continued

[Engine bench rapid acceleration/deceleration test]
Bearing: Deep groove ball bearing (type 6303)
Plating: Bearing groove portion

| | Specification | Forming method | Outer race film thickness (μm) | Inner race film thickness (μm) | Service life (hr) | Structure change |
|---|---|---|---|---|---|---|
| Example 2 | Ni film | Ni strike plating + Ni electroplating | 4 | — | 1050 | DEC |
| Example 3 | Ni film | Ni strike plating + Ni electroplating | 4 | 4 | 895 | DEC |
| Example 4 | Ni film | Ni strike plating + Ni electroplating | 7 | — | 675 | DEC |
| Example 5 | Ni film | Ni strike plating + Ni electroplating | 10 | — | 812 | DEC |
| Example 6 | Ni film | Ni strike plating + Ni electroplating + baking | 4 | — | 1235 | DEC |
| Example 7 | Ni film | Ni strike plating + electroless plating | 6 | — | 841 | DEC |
| Example 8 | Ni + P film | Ni strike plating + Ni–P electroplating | 3 | — | 907 | DEC |
| Example 9 | Cu film | C | 5 | — | 654 | DEC |
| Example 10 | Cu film | Cu electroplating + baking | 5 | — | 833 | DEC |
| Example 11 | Cu film | Cu electroless plating | 2 | 2 | 680 | DEC |
| Comparative example 1 | No film | None | — | — | 178 | Hydrogen embrittlement type |
| Comparative example 1 | Ni + P film | Ni strike plating + Ni–P electroplating | 18 | — | 450 | DEC |
| Comparative example 1 | Ni film | Cu electroplating | 20 | — | 403 | DEC |

TABLE 1A

[Engine bench rapid acceleration/deceleration test]
Bearing: Deep groove ball bearing (type 6303)
Plating: Bearing groove portion

| | Specification | Forming method | Outer race film thickness (μm) | Inner race film thickness (μm) | Shot peening |
|---|---|---|---|---|---|
| Example 2-1 | Ni film | Ni strike plating + Ni electroplating | 4 | — | None |
| Example 2-2 | Ni film | Ni strike plating + Ni electroplating | 4 | — | None |
| Example 2-3 | Ni film | Ni strike plating + Ni electroplating | 4 | — | Carried out |
| Example 2-4 | Ni film | Ni strike plating + Ni electroplating | 4 | — | Carried out |

TABLE 1B

|  | Micro-hardnes (HV(0.025)) | Forming method | α-Fe[211]peak half-power band width | Compressive residual stress (MPa) | Service life (Hr.) | Structure change |
|---|---|---|---|---|---|---|
| Example 2-1 | 813 | Ni strike plating + Ni electroplating | 6.8 | 650 | 1050 | DEC |
| Example 2-2 | 785 | Ni strike plating + Ni electroplating | 6.9 | 510 | 932 | DEC |
| Example 2-3 | 925 | Ni strike plating + Ni electroplating | 5.9 | 1200 | 611 | DEC |
| Example 2-4 | 860 | Ni strike plating + Ni electroplating | 6.2 | 1050 | 679 | DEC |

TABLE 2

| Ring (outer race) | Amount of diffusible hydrogen (ppm) |
|---|---|
| New article | 0.7 |
| Long-life article | 1.1 |
| Short-life article | 3.1 |

TABLE 3

[Thrust needle test for engine oil + water of 1000 ppm]
Bearing: Thrust roller bearing (FNTA-2542C manufactured by NSK Ltd.)
Plating: Roller

|  | Specification | Forming method | Film thickness (μm) | Service life (rev) | Structure change |
|---|---|---|---|---|---|
| Example 1' | Ni film | Ni strike plating + Ni electroplating + baking | 5 | 3.36E+07 | DEC |
| Example 2' | Ni film | Ni strike plating + Ni electroplating | 0.5 | 1.92E+07 | DEC |
| Example 3' | Ni film | Ni strike plating + electroless plating | 7 | 1.74E+07 | DEC |
| Example 4' | Ni + P film | Ni strike plating + Ni – P electroplating | 5 | 2.40E+07 | DEC |
| Example 5' | Cu film | Cu electroplating + baking | 4 | 1.72E+07 | DEC |
| Example 6' | Cu film | Cu electroless plating | 0.5 | 1.14E+07 | DEC |
| Example 7' | Cu film |  | 4 | 1.32E+07 | DEC |
| Comparative example 1' | No film | None | — | 3.06E+06 | Hydrogen embrittlement type |
| Comparative example 1' | NiP film | NiP strike plating + Ni electroplating | 17 | 9.90E+06 | DEC |
| Comparative example 1' | Cu film | Cu electroplating | 17 | 6.72E+06 | DEC |

TABLE 4

| Roller | Amount of diffusible hydrogen (ppm) |
| --- | --- |
| New article | 0.4 |
| Long-life article | 0.9 |
| Short-life article | 2.1 |

TABLE 5

[Box durability test for belt-type continuously variable transmission]
Bearing: Deep groove ball bearing
Plating: Bearing groove portion

| | Specification | Forming method | Outer race film thickness (μm) | Inner race film thickness (μm) | Service life (life factor) | Structure change |
| --- | --- | --- | --- | --- | --- | --- |
| Example 1" | Ni film | Ni strike plating + Ni electro-plating | 4 | 4 | 5 times or more of comparative example 1" (test stopped) | None |
| Comparative example 1" | No film | None | — | — | 1 (outer race flaked) | Hydrogen embrittlement type |

From Tables 2 and 4, it is found that when flaking occurs in a short life, the amount of intruding hydrogen is larger than that of the long-life article. Thereby, it can be said that the short-life flaking accompanied by the white structure of an irregular shape is a hydrogen embrittlement flaking mode caused by the intruding hydrogen. That is to say, it can be thought that the structure change mode shifts from hydrogen embrittlement type to DEC type due to the restraint of intruding hydrogen, which prolongs the service life.

As shown in Tables 1, 3 and 5, as the result of rolling fatigue life test, it has been proved that the rolling bearing for an automotive power train in accordance with the present invention, which is provided with Ni or Cu film acting as a hydrogen insulating layer on the surface, exhibits a DEC type structure change mode, so that the rolling fatigue life is improved significantly as compared with the bearing of a comparative example.

Additionally, as seen from Tables 1A and 1B, it hsa been experimetally proved that the rolling bearing for an automotive power train in accordance with the present invention can be further prolonged in service life by providing the surface portion on which plating is made, of the base material with an average microhardness (HV(0.025)) of not higher than 850, an α-Fe[211] peak half-power band width of not lower than 6.5, and a compressive residual stress of not higher than 1000 MPa.

Figure 6:
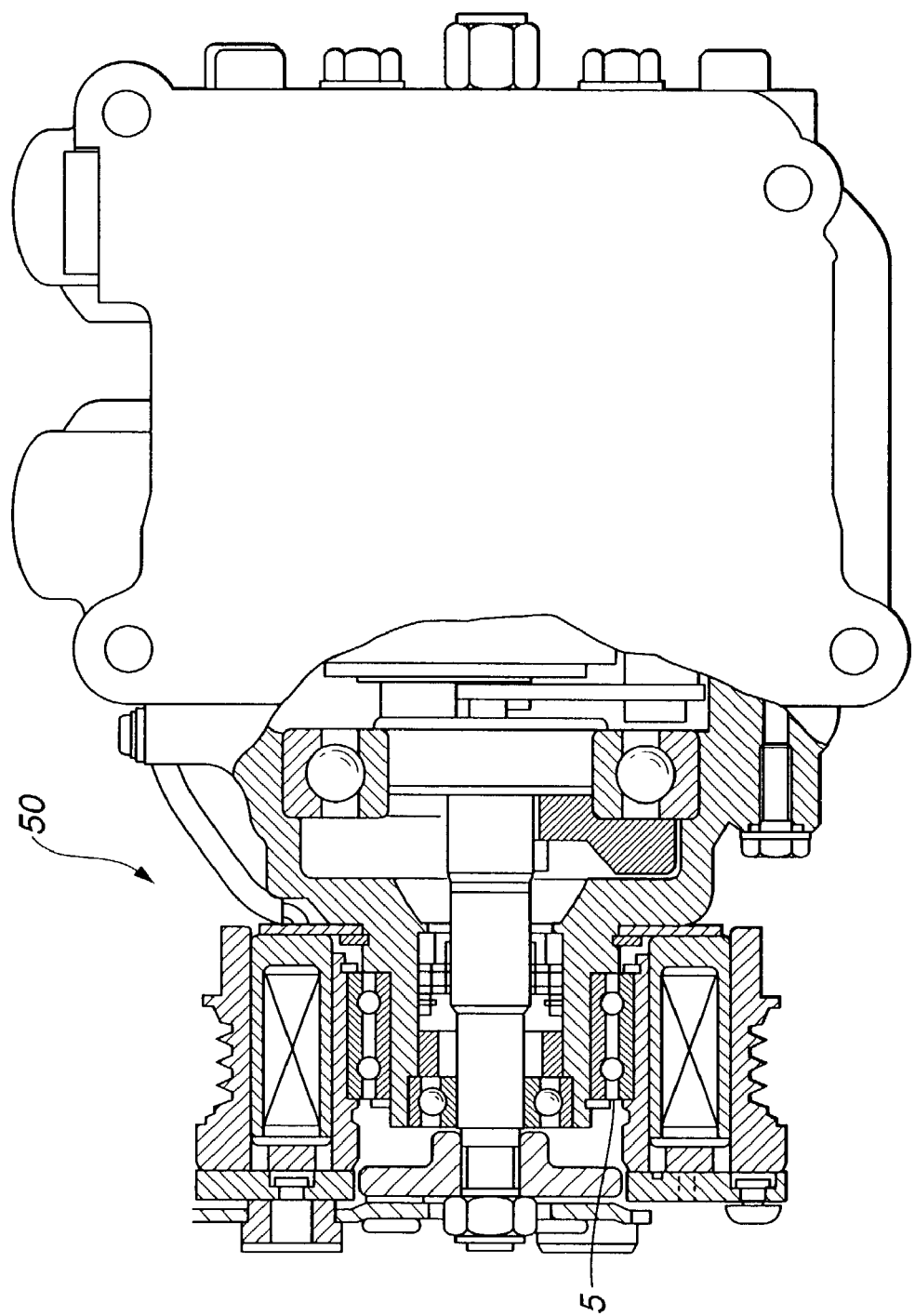
FIG. 6 is a front view, partly in section, showing a state in which a rolling bearing for an automotive power train in accordance with the present invention is assembled to an electromagnetic clutch for an automotive air conditioner.

The above-discussion of the embodiments or examples of the present invention illustrates the case where the rolling bearing is used as a bearing for the alternator 10, which is peripheral auxiliary equipment for an automotive power train, shown in FIGS. 1A and 1B, the case where the rolling bearing is used as a thrust roller bearing for a fuel injection pump 15, which is similarly peripheral auxiliary equipment for an automotive power train, shown in FIG. 3, and the case where the rolling bearing is used as a bearing for a belt-type continuously variable transmission, which is an automotive power train, shown in FIG. 9. However, the present invention is not limited to these cases. It is a matter of course that the rolling bearing for an automotive power train in accordance with the present invention can be used as a bearing 4 for an idler pulley 40 shown in FIG. 5, can be used as a bearing 5 of an electromagnetic clutch 50 for an automotive air conditioner shown in FIG. 6, or can be used as a rolling bearing which supports a power transmitting part for an automotive power train such as an engine, a transmission and a final drive.

As appreciated from the above, according to the embodiments of the present invention, in a rolling bearing for an automotive power train and peripheral auxiliary equipment such as an alternator, idler pulley, electromagnetic clutch for an automotive air conditioner, and fuel injection pump, a film which is made mainly of nickel (Ni) or copper (Cu) and has a thickness of 0.1 to 15 μm is formed on at least one member of an inner race 1a, an outer race 1b, and a ball 1d. As a result, even if the amount of generated hydrogen is increased by a change in service environment or lubrication environment, the intrusion of hydrogen into steel is surely restrained, and thus short-life flaking due to hydrogen embrittlement is prevented.

According to a second aspect of the present invention, a rolling bearing for a compressor is used under a lubicating condition in which hydrofluorocarbon as a refrigerant and a lubricang dissolvable in the hydrofluorocarbon are mixed. The a rolling bearing comprises a first race and a seocnd race. A rolling element is rotatably disposed between the first and second races. A film whose main component is a metal seclected from the group consisting of nickel (Ni) and copper (Cu) is formed on a surface of at least one of the first race, the second race and the rolling element.

In the rolling bearing for a compressor in accordance with the present invention, the film made mainly of nickel (Ni) or copper (Cu), which has a low hydrogen diffusion coefficient, is formed on at least one of the rolling element and the bearing races (rings) constituting the bearing. The rolling element and the bearing races are hereinafter respectively referred also as base materials. At this time, nickel (Ni) or copper (Cu), which has a low hydrogen diffusion coefficient, has a property of restraining the diffusion of hydrogen into the base material as shown in the later-described examples. Therefore, intrusion of hydrogen produced by the decomposition of hydrocarbon or entering water or due to other causes is restrained. That is to say, since the diffusion of hydrogen delays on the surface of the base material, hydrogen can be trapped on the surface of the base material, so that the intrusion of hydrogen into a portion in which the internal stress is high delays. Therefore, the amount of intruding hydrogen per unit time decreases.

Also, in the rolling bearing for a compressor in accordance with the present invention, the thickness of the film made mainly of nickel (Ni) or copper (Cu) is preferably 1 to 10 μm for the rolling element and 1 to 20 μm for each of the bearing rings. The reason for this is as described below. If the film thickness is smaller than 1 μm, the film is worn during the operation, and the action of film shutting off the intrusion of hydrogen is difficult to be provided for a long period of time, so that sufficient resistance to hydrogen embrittlement cannot be obtained. The lower limit value of film thickness is higher than that of the case where the same film is formed on a rolling element of a toroidal CVT (continuously variable transmission) or a grease-filled bearing for an alternator etc. This is because the rolling bearing for a compressor is used under a severe lubricating condition of refrigerant plus lubricant as compared with the grease-filled bearing, so that the film is easily worn.

Inversely, when the film is formed on the bearing ring, even if the upper limit value of film thickness exceeds 20 μm, the resistance to hydrogen embrittlement is not specially decreased, but as the film thickness increases, the stress in the film becomes excessive, and film flaking occurs at a relatively early stage, so that the film does not contribute so much to the improvement in rolling fatigue life. Also, with the increase in film thickness, the treatment time is prolonged. As a result, the cost becomes high. Therefore, it is also undesirable that the film thickness exceed 20 μm.

On the other hand, when the film is formed on the rolling element, the upper limit of film thickness is set at 10 μm. Because the rotation frequency of the rolling element is higher than that of the bearing ring, if a film having a thickness exceeding 10 μm is formed, in a process in which the wear, deformation, etc. of film proceeds during the rolling, smooth motion of the rolling element is inhibited. As a result, the effect of improving the rolling fatigue life decreases, so that it is also undesirable that the film thickness exceed 10 μm.

Also, the bearing used for a compressor for a refrigerator or an air conditioner is required to have a high accuracy, so that an unnecessarily larger film thickness undesirably results in generation of sound, vibration etc. due to dimensional change caused by film wear during the operation. As a bearing for a compressor, to which a thrust load is applied, a thrust ball bearing can be used in addition to a thrust roller bearing. When the film is formed on either one of the rolling element and the bearing ring from the viewpoint of cost, the film is preferably formed on the element that is relatively liable to be flaked. That is, the film is preferably formed on the rolling element (roller) for the roller bearing and on the bearing rings for the ball bearing.

Further, in the rolling bearing in accordance with the present invention, since the film is formed by electroplating or electroless plating, the film for shutting off intruding hydrogen can be formed by relatively easy treatment, so that high versatility and mass-productivity can be effectively achieved.

Still further, in the rolling bearing for a compressor in accordance with the present invention, it is preferable that at the stage after plating has been performed, baking is performed at a temperature of 200° C. or lower. Therefore, the hydrogen intruding into the base material or film at the time of the electroplating or electroless plating treatment and the hydrogen intruding into the base material at the time of raw material heat treatment (for example, carburizing hardening) are released.

If the baking temperature is higher than 200° C., although the amount of hydrogen released by baking increases, the base material is sometimes softened by being held at a high temperature. Therefore, by setting the baking temperature at 200° C. or lower, the softening of base material is inhibited while the hydrogen releasing effect is maintained. The baking is preferably performed in a vacuum furnace, by which the hydrogen releasing effect is further increased.

According to the rolling bearing for a compressor in accordance with the present invention, since the bearing is configured as described above, even if the amount of generated hydrogen is increased by a change in service environment or lubrication environment, the intrusion of hydrogen into steel can be inhibited securely. As a result, a very great effect of being capable of preventing short-life flaking due to hydrogen embrittlement is achieved.

Additionally, according to the rolling bearing for a compressor in accordance with the present invention, since the bearing is configured as described above, the film for shutting off intruding hydrogen can be formed by relatively easy treatment, so that a very great effect of being capable of realizing the improvement in versatility and mass-productivity is effectively achieved.

Further, according to the rolling bearing for a compressor in accordance with the present invention, since the bearing is configured as described above, a very great effect of being capable of releasing the hydrogen intruding into the base material or film at the time of the electroplating or electroless plating treatment and the hydrogen intruding into the base material at the time of raw material heat treatment (for example, carburizing hardening) is achieved.

Still further, according to the rolling bearing for a compressor in accordance with claim 5 of the present invention, a very great effect of being capable of performing operation in a severe environment of a refrigerator or a compressor for an air conditioner smoothly without trouble.

EXAMPLES

Examples of a rolling bearing for a compressor in accordance with the present invention will now be described, and the usefulness thereof will be shown in comparison with comparative examples. The measured values for the rolling bearing for a compressor in accordance with the present invention are those obtained by the following methods.

[Measuring Method for Film Thickness]

For the film thickness of a prepared specimen, the cross section of a film forming portion was quantified by observation using a SEM (Scanning Electron Microscope).

[Measuring Method for Phosphorus Content in Film]

The phosphorus content in film of the prepared specimen was quantified by using a commercially-available X-ray fluorescence analyzer. A plurality of samples whose phosphorus content was known and which has different content were measured. At this time, a strength-content calibration curve is prepared from each strength. The rolling bearing for a compressor in accordance with the present invention was cut into an appropriate size under the same condition, and measurement is made. The measured strength was converted into phosphorus content based on the aforementioned calibration curve.

Next, a manufacturing method for the rolling bearing for a compressor in accordance with the present invention will be described.

Figure 10:
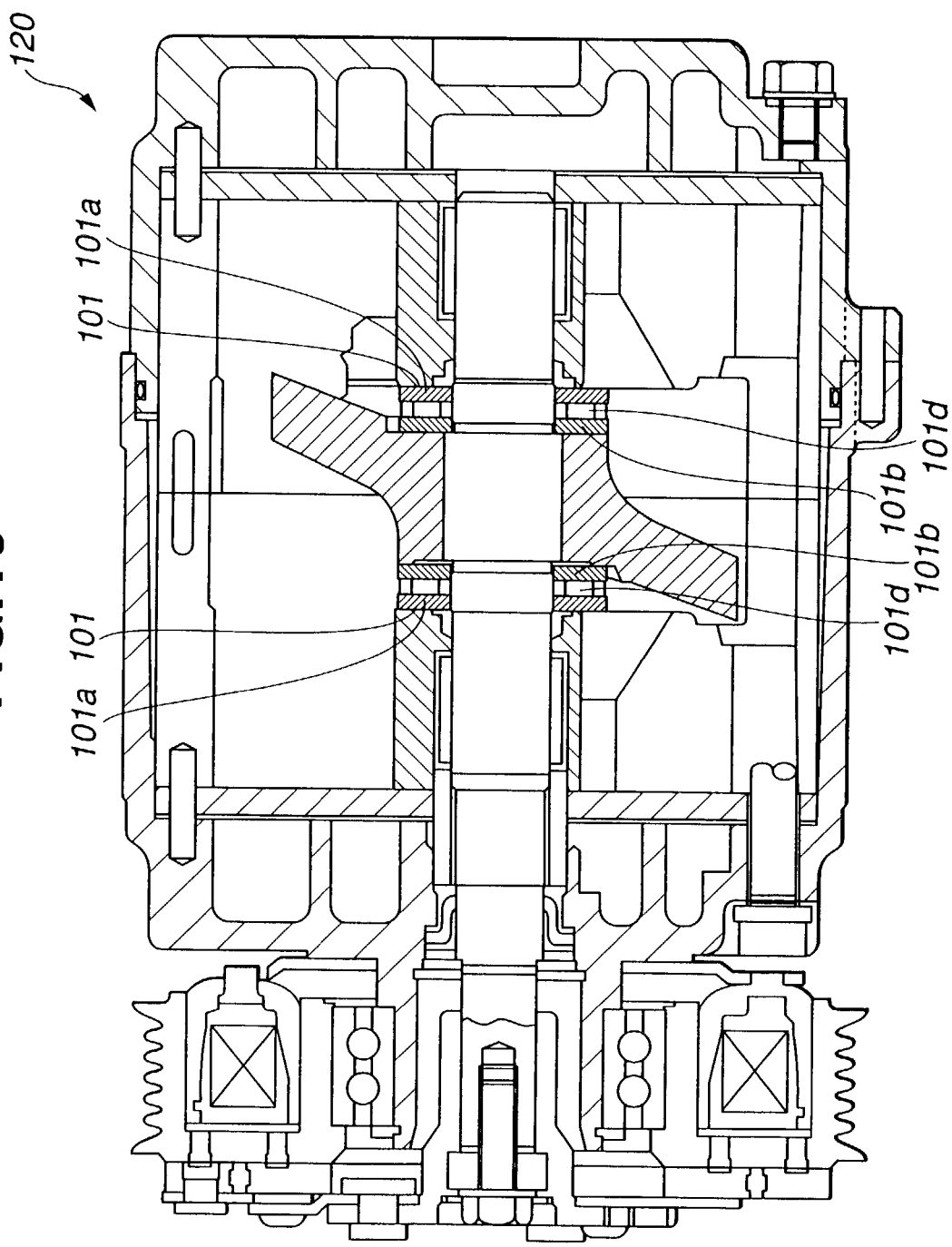
FIG. 10 is a schematic sectional view of a compressor for an automotive air conditioner in which an embodiment of a rolling bearing in accordance with the present invention is used, showing a state in which the rolling bearing is assembled in the compressor.

In the examples, using a thrust needle roller bearing 101 (as shown in FIG. 10) made of the later-described material of SUJ2 according to JIS G 4805, various types of films were formed under the following conditions.

[Conditions for Forming a Film Mainly Made of Nickel (Ni)]

1) Base material on which the film is formed: rollers of a needle roller bearing
2) Composition of plating solution in plating bath: A. Strike plating bath (Ni-based), B. Electroplating bath (Ni-based), C. Electroless plating bath (Ni-based), D. Electroplating bath (Cu-based), and E. Electroless plating bath (Cu-based) which are shown in the item "2) Composition of plating solution in plating bath" in connection with the above-discussed first aspect of the present invention.

Examples 1A to 3A, and 5A

After a roller 110d of a thrust roller bearing 101 was subjected to Ni-based strike plating (the aforementioned bath B was used), a film made mainly of Ni was formed by the electroplating method (the aforementioned bath B was used).

As the plating bath used in forming the film made mainly of Ni by the electroplating method (the aforementioned bath B), in example 5A, the plating bath in which 1 g/L of 50% hypophosphorous acid was contained was used, and in examples 1A to 3A, the plating bath in which 50% hypophosphorous acid was not contained was used. Also, in example 1A, after plating, baking was performed at 130° C. for 20 hours in a vacuum furnace.

Example 4A

After the roller 101d of the thrust roller bearing 101 was subjected to Ni-based strike plating made mainly of nickel (Ni) (the aforementioned bath A was used), a film consisting mainly of Ni was formed by the electroless plating method (the aforementioned bath C was used).

Examples 6A to 9A

A plating film consisting mainly of copper (Cu) was formed in the roller 101d of the thrust roller bearing 101. When this Cu plating film was formed, in examples 6A, 7A and 8A, the electroplating method (the aforementioned bath D was used) was used, and in example 9A, the electroless plating method (the aforementioned bath E was used) was used. Also, in example 6A, after plating, baking was performed at 130° C. for 20 hours in a vacuum furnace.

Comparative Example 1A

A specimen not subjected to plating was prepared.

Next, a method for evaluating the rolling bearing for a compressor in accordance with the present invention will be described.

Figure 11:
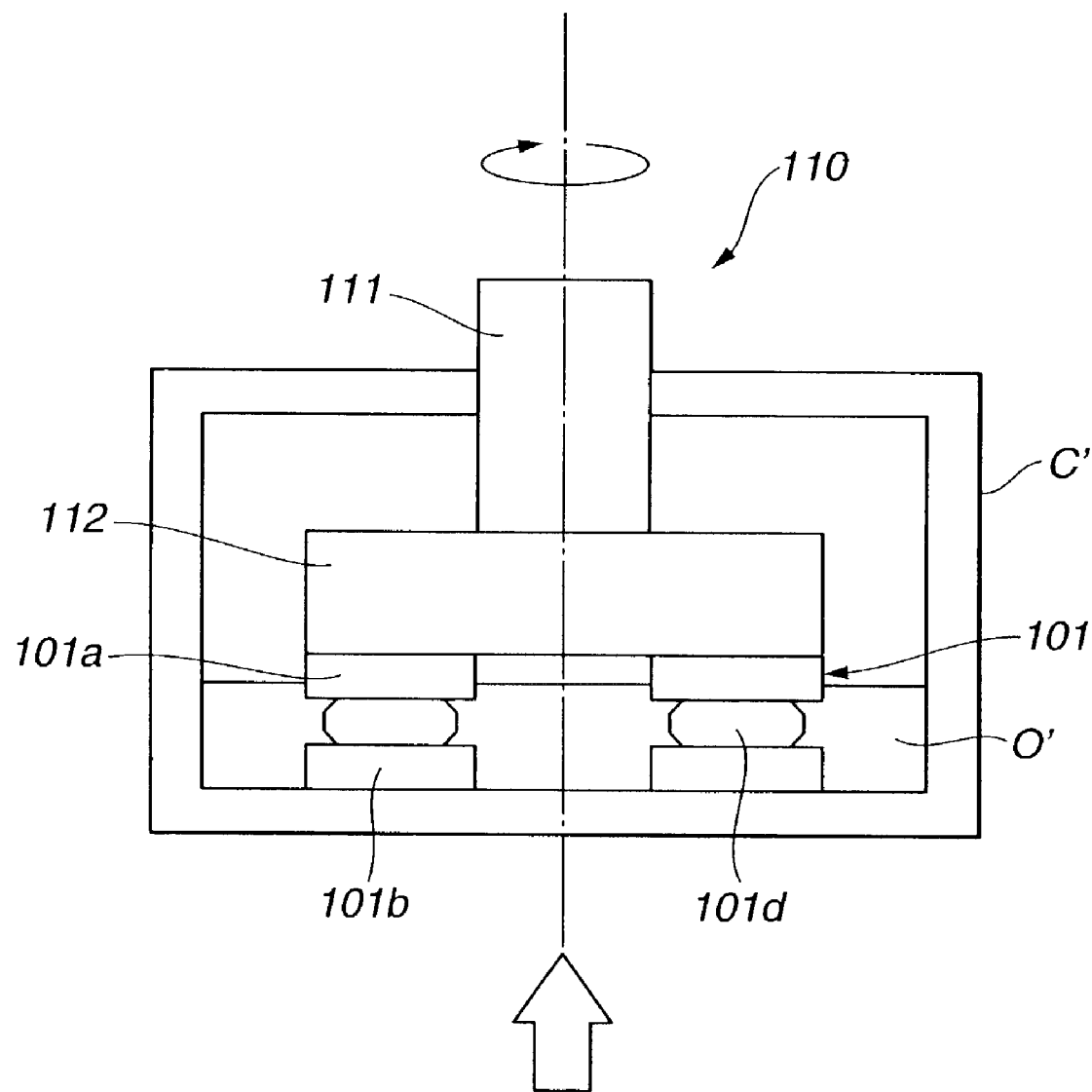
FIG. 11 is a schematic sectional view showing a state in which a thrust roller bearing to be assembled in the compressor of FIG. 1 is subjected to a rolling or thrust test by using a thrust testing machine.

As shown in FIG. 11, in an lubricating mixture O' which was prepared by mixing 97% of white kerosene and 3% of polyalkylene glycol (PAG) serving as a lubricant with reference to the condition used in Japanese Patent Provisional Publication No. 08-177864, a commercially-available roller bearing (FNTA-2542C manufactured by NSK Ltd.) 101 was set at the bottom of a lubricating mixture vessel C' filled with the lubricating mixture O'. The rolling test of the roller bearing 101 was conducted by bringing a pressing disk 112 of a rotating shaft 111 of a thrust testing machine 110 into contact with a bearing ring 1a located on the upper side in the figure and by rotating the rotating shaft 111 at 1000 rpm while applying a load (5880 Nm) in a direction indicated by an arrow in the figure. Also, a rolling fatigue life was detected by a vibration sensor, and the total revolutional number of the roller bearing reaching to a so-called 50% breakage was detected as a service life which was called L-50 service life (rev). In Table 6, the total revaluation number is indicated, for example, as 1.14E+07 (corresponding to $1.14 \times 10^7$).

Although the utility of the present invention has been proved by subjecting the roller 110d of the roller bearing 101 to plating in the examples, it is a matter of course that even if the present invention is applied to, for example, the bearing race (ring) of the ball bearing, the same effect can be achieved.

Table 6 gives the result of rolling fatigue life test of bearings in examples and comparative example evaluated under the above-described test conditions. Table 6 also gives rough characteristic summaries (specification, forming method, and film thickness) of the films of the bearings of examples and comparative examples examined before the test. Additionally, Table 6 gives as to whether hydrogen embrittlement was present (occurred) or absent (not occurred).

Figure 12:
FIG. 12 is a photograph showing a cross-sectional microstructure (with white structure) near a flaked portion of the thrust roller bearing after the thrust test.
Figure 13:
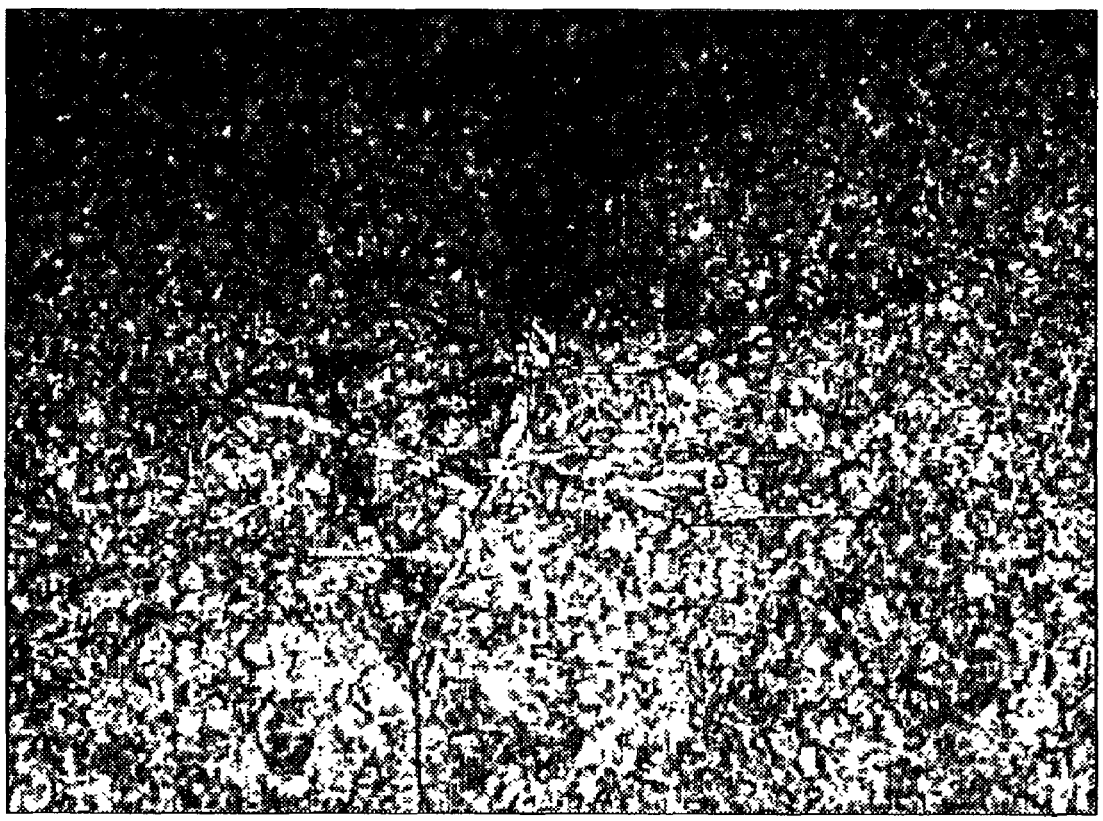
FIG. 13 is a photograph showing a cross-sectional microstructure (with white structure) near a flaked portion of the thrust roller bearing after the thrust test, which is similar to FIG. 12.

Also, FIGS. 12 and 13 are respectively photographs of cross-sectional microstructure near flaked portions of the roller 110d of the roller bearing 101. In the photographs of FIGS. 12 and 13, the white structure of the irregular shape and the internal crack are observed at the slaked portion in a specimen (corresponding comparative example 1A) of the short life in which flaking is made in a relatively short time.

Table 7 gives measurement results of the quantity of diffusible hydrogen in steel of the roller after rolling fatigue test has been finished. The measurement was made by using a thermal desorption gas analyzer (UPM-ST-200R manufactured by ULVAC), and the quantity of hydrogen released at a heating temperature of 400° C. or lower was taken as the quantity of diffusible hydrogen. In Table 7, a new article corresponds to example 1A before the rolling fatigue test; a long-life article corresponds to example 1A after the rolling fatigue test; and a short-life article corresponds to comparative example 1A after the rolling fatigue life.

TABLE 6

Thrust needle test in white kerosene + PAG
Plating: Roller

| | Specification | Forming method | Film thickness (μm) | Service life (rev) | Hydrogen embrittlement |
|---|---|---|---|---|---|
| Example 1A | Ni film | Ni strike plating + Ni electroplating + baking | 5 | 1.14E+07 | Absent |
| Example 2A | Ni film | Ni strike plating + Ni electroplating | 1 | 5.40E+06 | Absent |

TABLE 6-continued

Thrust needle test in white kerosene + PAG
Plating: Roller

| | Specification | Forming method | Film thickness (μm) | Service life (rev) | Hydrogen embrittlement |
|---|---|---|---|---|---|
| Example 3A | Ni film | Ni strike plating + Ni electroplating | 15 | 4.14E+06 | Absent |
| Example 4A | Ni film | Ni strike plating + electroless plating | 5 | 7.56E+06 | Absent |
| Example 5A | Ni + P film | Ni strike plating + Ni-P electroplating | 5 | 8.82E+06 | Absent |
| Example 6A | Cu film | Cu electroplating + baking | 4 | 6.66E+06 | Absent |
| Example 7A | Cu film | Cu electroplating | 15 | 4.38E+06 | Absent |
| Example 8A | Cu film | Cu electroplating | 0.5 | 3.48E+06 | Absent |
| Example 9A | Cu film | Cu electroless plating | 4 | 4.80E+06 | Absent |
| Comparative example 1A | No film | None | — | 1.20E+06 | Present |

TABLE 7

| Roller | Amount of diffusible hydrogen (ppm) |
|---|---|
| New article | 0.4 |
| Long-life article | 0.6 |
| Short-life article | 1.2 |

From Table 7, it is found that the roller in which a white structure exists in the interior and flaking occurs in a short life has a larger amount of intruding hydrogen after testing than the long-life roller. That is to say, the short-life roller is thought to be subjected to hydrogen embrittlement flaking caused by the embrittlement of the material due to hydrogen intruding during the rolling. Also, from Table 7, it is found that the amount of intruding hydrogen after testing is restrained in the present invention in which the film consisting mainly of Ni or Cu acting as a hydrogen insulating layer is provided on the surface, as compared with comparative example in which flaking occurs in a short life.

That is to say, from the test results shown in Tables 6 and 7, it has been confirmed that in the examples according to the present invention, the intrusion of hydrogen during the rolling can be restrained as compared with comparative example, and the rolling fatigue life can be increased significantly.

As appreciated from the above, according to the second aspect of the present invention, in a rolling bearing for a compressor used under a lubricating condition in which hydrofluorocarbon serving as a refrigerant and a lubricant that is dissolved therein are mixed with each other, a film made mainly of nickel (Ni) or copper (Cu) is formed on at least one member of a rolling element 101d and bearing races 101a, 101b. As a result, even if the amount of generated hydrogen is increased by a change in service environment or lubrication environment, intrusion of hydrogen into steel can be surely restrained, thereby preventing a short-life flaking due to hydrogen embrittlement.

The entire contents of Japanese Patent Applications P2001-349645 (filed Nov. 15, 2001), P2001-356817 (filed Nov. 22, 2001) and P2002-113382 (filed Apr. 16, 2002) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. A rolling bearing comprising:
   a first race;
   a second race;
   a rolling element rotatably disposed between the first and second races; and
   a film whose main component is a metal selected from the group consisting of nickel and copper and in which the film is not formed from any alloys of a metal selected from the group consisting of nickel and copper, the film having a thickness ranging from 3 to 6 μm, the film being formed on a surface of at least one of the first race, the second race and the rolling element.

2. A rolling bearing used in a system including an automotive power train and a peripheral auxiliary equipment of the power train, the rolling bearing comprising:
   a first race;
   a second race;
   a rolling element rotatably disposed between the first and second races; and
   a film whose main component is a metal selected from the group consisting of nickel and copper and in which the film is not formed form any alloys of a metal selected from the group consisting of nickel and copper, and the film having a thickness ranging from 3 to 6 μm, the film being formed on a surface of at least one of the first race, the second race and the rolling element.

3. A rolling bearing as claimed in claim 2, wherein the film is formed on at least one of the first race, the second race and the rolling element has a thickness in a relation of ≦4 μm.

4. A rolling bearing as claimed is claim 2, wherein the film is formed by plating including at least one of electroplating and electroless plating.

5. A rolling bearing as claimed in claim 4, wherein the film is subjected to baking at a temperature of not higher than 200° C. after the plating.

6. A rolling bearing as claimed in claim 4, wherein a surface portion to be plated, of at least one of the first race, the second race and the rolling element has an average microhardness (HV(0.025)) of not higher than 850.

7. A rolling bearing as claimed in claim 4, wherein a surface portion to be plated, of at least one of the first race, the second race and the rolling element has a half-power band width of not lower than 6.5, the half-power band width being of a peak obtained by X-ray diffraction.

8. A rolling bearing as claimed in claim 4, wherein a surface portion to be plated, of at least one of the first race, the second race and the rolling element has a compressive residual stress of not higher than 1000 MPa.

9. A rolling bearing as claimed in claim 2, wherein the peripheral auxiliary equipment is at least one of an alternator, an idler pulley, and an electromagnetic clutch for an automotive air conditioner.

10. A rolling bearing as claimed in claim 2, wherein the peripheral auxiliary equipment is a fuel injection pump.

11. A rolling bearing as claimed in claim 2, wherein the automotive power train includes a transmission having a power transmitting part which is rotatably supported by the rolling bearing.

12. A rolling bearing as claimed in claim 2, wherein the automotive power train includes a belt-type continuously variable transmission having a power transmitting part which is rotatably supported by the rolling bearing.

13. A rolling bearing for as claimed in claim 2, wherein the film has a thickness ranging from 3 to 4 μm.

14. A rolling bearing for a compressor, used under a lubricating condition in which hydrofluorocarbon as a refrigerant and a lubricant dissolvable in the hydrofluorocarbon are mixed, the rolling bearing comprising:
a first race;
a second race;
a rolling element rotatably disposed between the first and second races; and
a film whose main component is a metal selected from the group consisting of nickel and copper, and in which the film is not formed from any alloys of a metal selected from the group consisting of nickel and copper, the film being formed on a surface of at least one of the first race, the second race and the rolling element.

15. A rolling bearing as claimed in claim 13, wherein the film is formed on the surface of at least one of the first and second races and has a thickness ranging from 1 to 20 μm.

16. A rolling bearing as claimed in claim 13, wherein the film is formed by plating including at least one of electroplating and electroless plating.

17. A rolling bearing as claimed in claim 16, wherein the film is subjected to baking at a temperature of not higher than 200° C. after the plating.

18. A rolling bearing as claimed in claim 13, wherein the compressor forms part of a refrigerator.

19. A rolling bearing as claimed in claim 13, wherein the compressor forms part of an air conditioner.

20. A rolling bearing as claimed in claim 13, wherein the film is formed on the surface of the rolling element and has a thickness ranging from 1 to 10 μm.

21. A rolling bearing as claimed in claim 14, wherein the film has a thickness ranging from 1 to 5 μm.

* * * * *